United States Patent
Pichler et al.

(10) Patent No.: US 11,270,177 B2
(45) Date of Patent: Mar. 8, 2022

(54) RFID TRANSPONDER AND CORRESPONDING OPERATING METHOD

(71) Applicant: NXP B.V., Eindhoven (NL)

(72) Inventors: Thomas Pichler, Graz (AT); Ivan Jesus Rebollo Pimentel, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/015,871

(22) Filed: Sep. 9, 2020

(65) Prior Publication Data

US 2021/0103789 A1  Apr. 8, 2021

(30) Foreign Application Priority Data

Oct. 2, 2019 (EP) .................................. 19200956

(51) Int. Cl.
| | | |
|---|---|---|
| *G06K 19/07* | (2006.01) | |
| *H02M 3/07* | (2006.01) | |
| *G06K 7/10* | (2006.01) | |

(52) U.S. Cl.
CPC ..... *G06K 19/0713* (2013.01); *G06K 19/0723* (2013.01); *H02M 3/07* (2013.01); *G06K 2007/10495* (2013.01)

(58) Field of Classification Search
CPC .......... G06K 19/0713; G06K 19/0723; G06K 2007/10495; G06K 19/0715; G06K 7/10217; G06K 7/10198; H02M 3/07
See application file for complete search history.

(56) References Cited

U.S. PATENT DOCUMENTS

| | | | |
|---|---|---|---|
| 6,242,970 B1 | 6/2001 | Grant et al. | |
| 6,370,075 B1 | 4/2002 | Haeberli et al. | |
| 6,486,728 B2 | 11/2002 | Kleveland | |
| 7,023,260 B2 | 4/2006 | Thorp | |
| 7,256,640 B2 | 8/2007 | Ucciardello et al. | |
| 7,944,279 B1* | 5/2011 | El Waffaoui | H02M 3/073 |
| | | | 327/536 |
| 8,186,601 B2* | 5/2012 | Russell | G06K 19/0713 |
| | | | 235/492 |
| 8,699,247 B2 | 4/2014 | Nguyen et al. | |
| (Continued) | | | |

FOREIGN PATENT DOCUMENTS

| | | |
|---|---|---|
| EP | 2031546 B1 | 6/2012 |
| EP | 3113082 B1 | 8/2018 |

OTHER PUBLICATIONS

U.S. Appl. No. 16/786,109; Inventor: Maurits Mario Nicolaas Storms, et al.; "Agile Time-Continuous Memory Operation for a Radio Frequency Identification Transponder;" Filed Feb. 10, 2020.

*Primary Examiner* — Seung H Lee (57) ABSTRACT

In accordance with a first aspect of the present disclosure, a radio frequency identification (RFID) transponder is provided, comprising: at least one functional component configured to perform a function of the RFID transponder; a charge pump configured to supply an output voltage to said functional component, wherein said charge pump comprises a plurality of charge pump stages; a charge pump controller configured to control a number of charge pump stages which contribute to the output voltage. In accordance with a second aspect of the present disclosure, a corresponding method of operating an RFID transponder is conceived.

14 Claims, 6 Drawing Sheets

(56) References Cited

U.S. PATENT DOCUMENTS

| | | | |
|---|---|---|---|
| 2006/0197668 A1* | 9/2006 | Oliver | G06K 19/0701 340/572.4 |
| 2009/0057418 A1* | 3/2009 | Kozuma | G06K 19/0723 235/492 |
| 2010/0019907 A1 | 1/2010 | Shanks | |
| 2011/0133820 A1 | 6/2011 | Pan | |
| 2013/0299593 A1* | 11/2013 | Glidden, III | G06K 19/0723 235/492 |

* cited by examiner

RFID TRANSPONDER AND CORRESPONDING OPERATING METHOD

CROSS-REFERENCE TO RELATED APPLICATIONS

This application claims priority under 35 U.S.C. § 119 to European Patent Application No. 19200956.1, filed on Oct. 2, 2019, the contents of which are incorporated by reference herein.

TECHNICAL FIELD

The present disclosure relates to a radio frequency identification transponder. Furthermore, the present disclosure relates to a method of operating a radio frequency identification transponder.

BACKGROUND

Nowadays, radio frequency identification (RFID) transponders are widely used, in different areas of industry and commerce and for various purposes. RFID transponders may for example be embodied as so-called RFID tags or RFID cards. It is noted that, in the present disclosure, near field communication (NFC) transponders are regarded as a specific type of RFID transponders. Thus, the principles described herein may also be applied to NFC transponders.

SUMMARY

In accordance with a first aspect of the present disclosure, a radio frequency identification (RFID) transponder is provided, comprising: at least one functional component configured to perform a function of the RFID transponder; a charge pump configured to supply an output voltage to said functional component, wherein said charge pump comprises a plurality of charge pump stages; a charge pump controller configured to control a number of charge pump stages which contribute to the output voltage.

In one or more embodiments, the charge pump controller is configured to control said number of charge pump stages in dependence on the output voltage.

In one or more embodiments, the charge pump controller is configured to disable one or more of said charge pump stages.

In one or more embodiments, the charge pump controller is configured to disable more charge pump stages as the output voltage increases.

In one or more embodiments, the charge pump controller is configured to disable fewer charge pump stages as the output voltage decreases.

In one or more embodiments, the charge pump controller is configured to control said number of charge pump stages in dependence on a status indicator.

In one or more embodiments, the charge pump comprises a sequence of n charge pump stages, wherein the charge pump stages are coupled to ground through a plurality of first controllable switches, wherein the charge pump stages are coupled to each other through a plurality of second controllable switches, and wherein the charge pump controller is configured to disable one or more specific charge pump stages $i=\{1, 2, 3, \ldots, n\}$ by: opening the second controllable switch between said charge pump stage i and the next charge pump stage i+1; closing the first controllable switch between the next charge pump stage i+1 and ground.

In accordance with a second aspect of the present disclosure, a method of operating a radio frequency identification (RFID) transponder is conceived, comprising: controlling, by a charge pump controller of the RFID transponder, a number of charge pump stages which contribute to an output voltage of a charge pump; supplying, by the charge pump, the output voltage to at least one functional component of the RFID transponder; performing, by the functional component, a function of the RFID transponder.

In one or more embodiments, the charge pump controller controls said number of charge pump stages in dependence on the output voltage.

In one or more embodiments, the charge pump controller disables one or more of said charge pump stages.

In one or more embodiments, the charge pump controller disables more charge pump stages as the output voltage increases.

In one or more embodiments, the charge pump controller disables fewer charge pump stages as the output voltage decreases.

In one or more embodiments, the charge pump controller controls said number of charge pump stages in dependence on a status indicator.

In one or more embodiments, the charge pump comprises a sequence of n charge pump stages, wherein the charge pump stages are coupled to ground through a plurality of first controllable switches, wherein the charge pump stages are coupled to each other through a plurality of second controllable switches, and wherein the charge pump controller disables one or more specific charge pump stages $i=\{1, 2, 3, \ldots, n\}$ by: opening the second controllable switch between said charge pump stage i and the next charge pump stage i+1; closing the first controllable switch between the next charge pump stage i+1 and ground.

DESCRIPTION OF DRAWINGS

Embodiments will be described in more detail with reference to the appended drawings, in which.

DESCRIPTION OF EMBODIMENTS

Nowadays, radio frequency identification (RFID) transponders are widely used, in different areas of industry and commerce and for various purposes. RFID transponders may for example be embodied as so-called RFID tags or RFID cards. It is noted that, in the present disclosure, near field communication (NFC) transponders are regarded as a specific type of RFID transponders. Thus, the principles described herein may also be applied to NFC transponders.

RFID communication may be based on inductive coupling. The communication between an RFID reader and an RFID transponder, such as an RFID tag, is often realized by means of load modulation and can be split into a forward link and a return link. More specifically, the RFID reader may transmit commands to the RFID transponder through a forward link, and the RFID transponder may transmit responses to those commands back to the RFID reader through a return link. The RFID transponder contains a modulator, which load modulates a carrier signal. Different types of load modulation exist, for example active load modulation (ALM) and passive load modulation (PLM). The return link may also be referred to as a backscatter signal or more concisely as "backscatter".

To perform load modulation and other functions, an integrated circuit within an RFID transponder needs to be provided with power. In a passive transponder, this power is extracted from the field generated by the reader. A transponder of the kind set forth typically comprises a charge pump, which is configured to convert a low input voltage into a higher output voltage. The higher output voltage generated by the charge pump is supplied to the transponder's integrated circuit, which contains one or more functional components (e.g. a modulator). In other words, the charge pump ensures that the transponder can operate at low input voltages.

RFID systems, in particular ultra-high frequency (UHF) RFID systems, should cover a large range of input power and voltage. As mentioned above, a charge pump is often used to convert a low input voltage to a higher output voltage. This ensures a correct operation of an RFID transponder even at low input power. The number of used stages is typically fixed. Therefore, under high input voltage conditions the output voltage should be limited to avoid damage to the transponder's integrated circuit (IC). This leads to a change in the IC input impedance, which in turn has a negative impact on the RFID system. Now discussed are an RFID transponder and a corresponding method of operating an RFID transponder, which facilitate reducing this negative impact on the RFID system.

Figure 1:
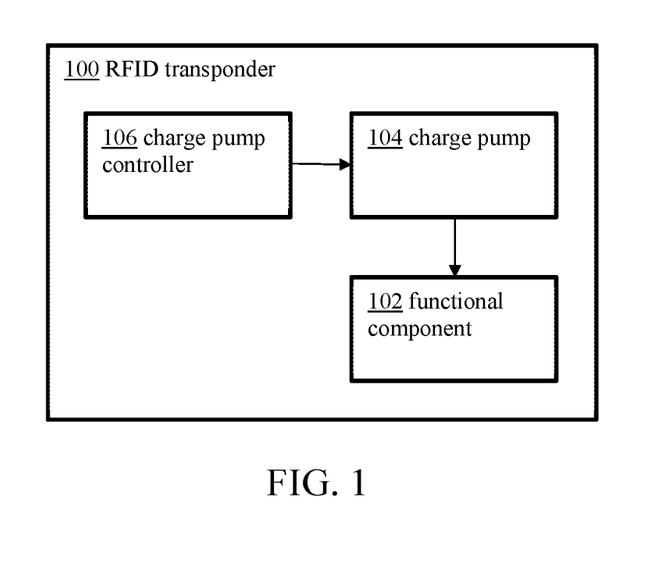
FIG. 1 shows an illustrative embodiment of an RFID transponder.

FIG. 1 shows an illustrative embodiment of an RFID transponder 100. The RFID transponder comprises a functional component 102, a charge pump 104 and a charge pump controller 106. The functional component 102 is configured to perform a function of the RFID transponder 100, for example load modulation. The charge pump 104 is configured to supply an output voltage to the functional component 102, so that the functional component 102 can perform said function. The charge pump 104 receives an input voltage which is derived from a field generated by an RFID reader (not shown) that is external to the RFID transponder 100. This input voltage is converted into a higher output voltage by the charge pump 104 and then supplied to the functional component 102. It is noted that the RFID transponder 100 may contain other functional components (not shown), which may also receive the output voltage of the charge pump 104. The charge pump 104 comprises a plurality of charge pump stages (not shown). Furthermore, the charge pump controller 106 is configured to control a number of charge pump stages which contribute to the output voltage. In other words, not all charge pump stages may be used for generating the output voltage, but only a subset of the charge pump stages. However, it is noted that all stages may remain active, while only a subset of the stages contributes to the output voltage, to ensure that the input impedance will not change significantly. More specifically, the stages may remain active in the sense that the switching inputs, such as the radio frequency field, or the clock of the stages is not removed and that they remain operational. For instance, the signal received from the antenna and/or the clock signal may still be fed to the stages that do not contribute the output voltage. In this way, it can be avoided, for instance, that the output voltage of the charge pump 104 is too high. Thus, the output voltage does not need to be limited. This, in turn, may have several advantages: the IC input impedance will not change significantly—thus avoiding a negative impact on the RFID system—and no additional component (i.e., a voltage limiter) is needed.

In one or more embodiments, the charge pump controller 106 is configured to control the number of charge pump stages in dependence on the output voltage. Thus, the output voltage of the charge pump 104 may be fed back to the charge pump controller 106, and the charge pump controller 106 may reduce or increase the number of charge pump stages that contribute to the output voltage in dependence on said output voltage. In this way, the output voltage of the charge pump 104 can be adjusted dynamically and efficiently. Alternatively, or in addition, the charge pump controller 106 may be configured to control the number of charge pump stages in dependence on a status indicator. This status indicator may be provided, for example, by a power sensor, one or more voltage sensors, one or more current sensors, temperature sensors, light sensors, or be indicative of internal states, a field of application and/or requested operating modes (certification, test, production, etc.). All these indicators facilitate configuring the charge pump controller 106, to prevent damage due to an overvoltage generated by the charge pump 104. Thus, by controlling the number of charge pump stages in dependence on said status indicator an effective overvoltage protection may be accomplished.

In one or more embodiments, the charge pump controller 106 is configured to disable one or more of said charge pump stages. For instance, if the charge pump stages are connected to each other in a chain, one or more these stages may be disconnected from the chain, to reduce the output voltage generated by the charge pump 104. It is noted that, in the context of the present disclosure, disabling charge pump stages refers to preventing that the stages contribute to the output voltage of the charge pump. In other words, disabling charge pump stages does not imply that the states are made inactive. In a practical and effective implementation, the charge pump controller 106 is configured to disable more (i.e., a larger number of) charge pump stages as the output voltage increases. In this way, an excessive output voltage can easily be avoided. Furthermore, in a practical and effective implementation, the charge pump controller 106 is configured to disable fewer (i.e., a smaller number of) charge pump stages as the output voltage decreases. In this way, the output voltage can easily and quickly be boosted when required.

In one or more embodiments, the charge pump comprises a sequence of n charge pump stages, the charge pump stages are coupled to ground through a plurality of first controllable switches, the charge pump stages are coupled to each other through a plurality of second controllable switches, and the charge pump controller is configured to disable one or more specific charge pump stages i={1, 2, 3, . . . , n} by opening the second controllable switch between said charge pump stage i and the next charge pump stage i+1 and closing the first controllable switch between the next charge pump stage i+1 and ground. In this way, the charge pump stages of said subset are easily disabled, resulting in a minimal change of the IC input impedance. Furthermore, there is no need to short or change the driving signals for the charge pump, which are received through the antenna terminals RFp and RFn and which are derived from the radio frequency field generated by the external RFID reader.

Figure 2:
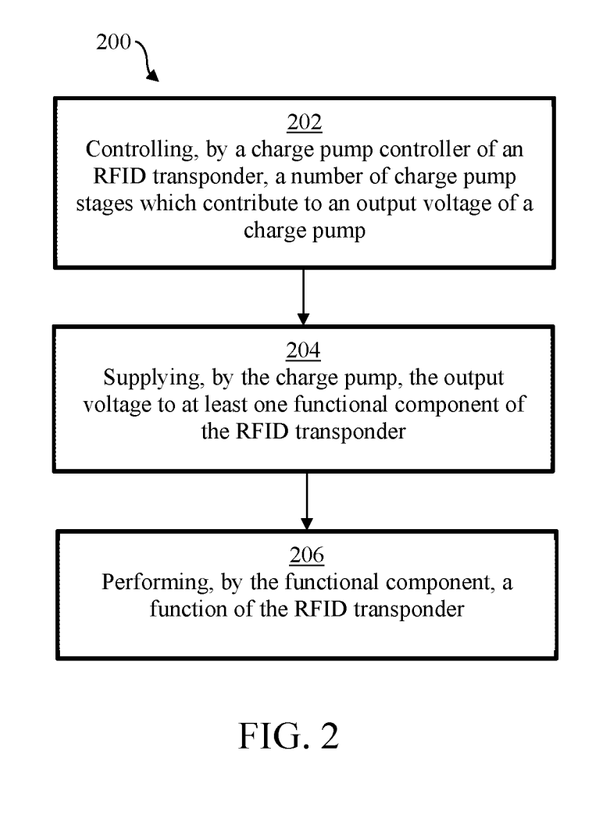
FIG. 2 shows an illustrative embodiment of a method of operating an RFID transponder.

FIG. 2 shows an illustrative embodiment of a method 200 of operating an RFID transponder. The method 200 comprises the following steps: at 202, controlling, by a charge pump controller of an RFID transponder, a number of charge pump stages which contribute to an output voltage of a charge pump; at 204, supplying, by the charge pump, the output voltage to at least one functional component of the RFID transponder; and at 206, performing, by the functional component, a function of the RFID transponder.

Figure 3:
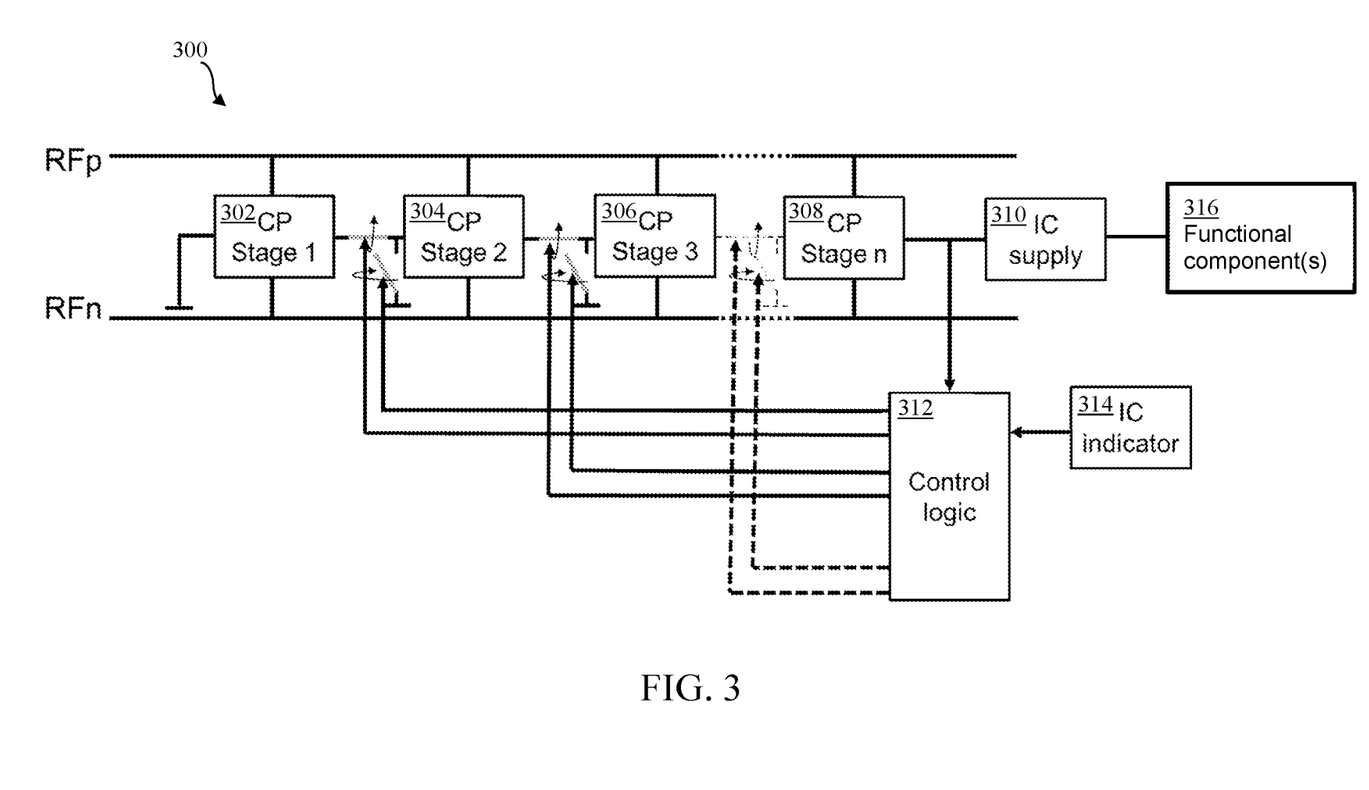
FIG. 3 shows another illustrative embodiment of an RFID transponder.

FIG. 3 shows another illustrative embodiment of an RFID transponder 300. The RFID transponder 300 includes a plurality of charge pump stages 302, 304, 306, 308 and control logic 312 which is configured to control the plurality of charge pump stages 302, 304, 306, 308. The charge pump stages 302, 304, 306, 308 are coupled to antenna terminals RFp and RFn. In operation, the charge pump stages 302, 304, 306, 308 generate an output voltage which can be received by an IC supply module 310. The IC supply module 310 may supply power to one or more functional components 316 of the RFID transponder 300. In accordance with the present disclosure, the control logic 312 is configured to control the number of charge pump stages 302, 304, 306, 308 which contribute to generating the output voltage. For instance, the control logic 312 may be configured to control said number of charge pump stages 302, 304, 306, 308 in dependence on the output voltage and/or in dependence on an IC indicator 314 (i.e., a status indicator). Controllable switches are provided between each pair of charge pump stages 302, 304, 306, 308. Furthermore, controllable switches are provided between the charge pump stages 302, 304, 306, 308 and a ground terminal.

It is noted that each pair of switches that is present between two sequential charge pump stages contains one switch for connecting the two charge pump stages to each other and one switch for connecting the first one of said stages to ground. The switches in each pair are complementary in the sense that if one of said switches is closed, then the other one will be opened. The operation of the RFID transponder will be described with reference to FIGS. 4 to 6.

Figure 4:
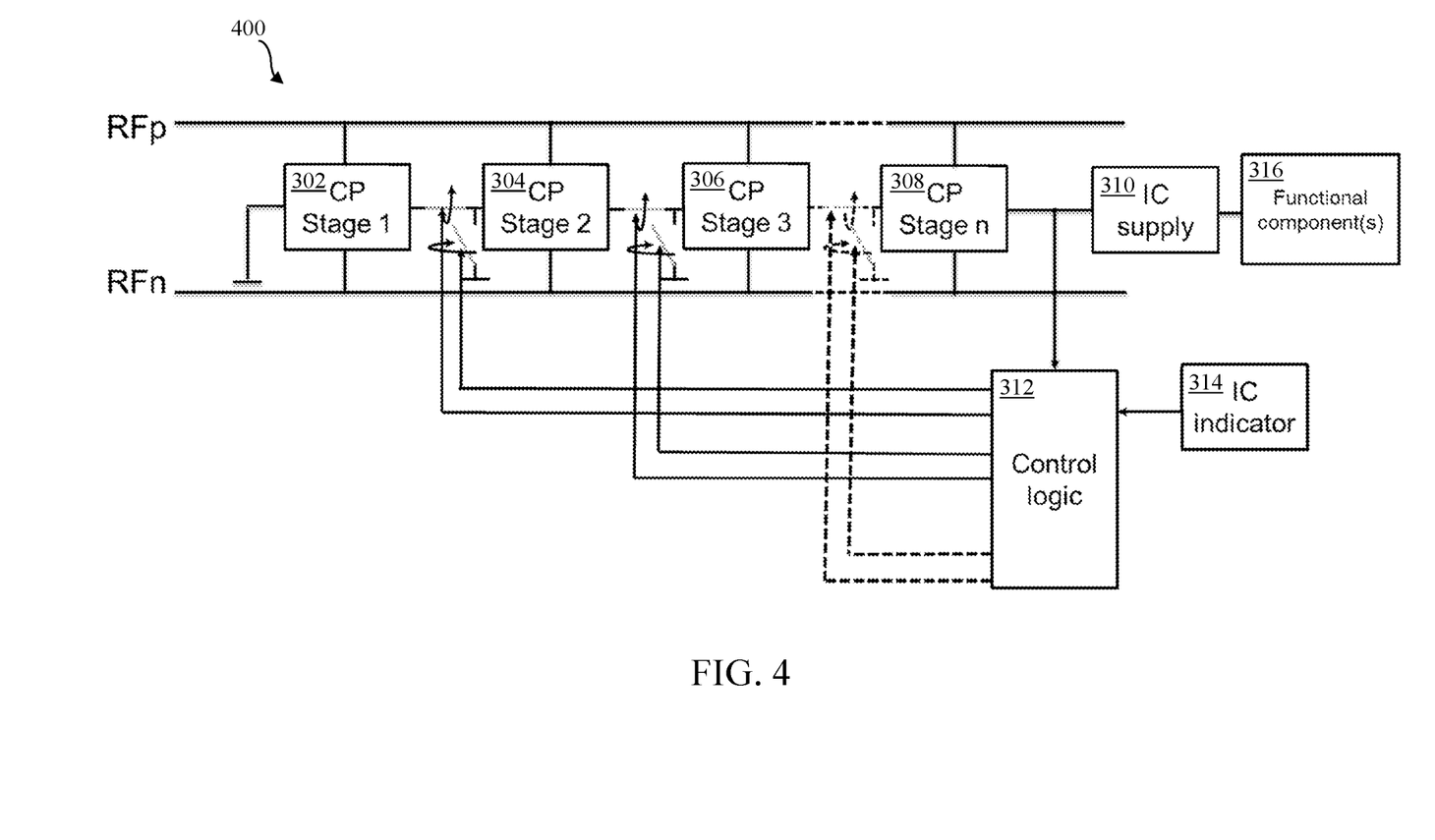
FIG. 4 shows a further illustrative embodiment of an RFID transponder.

FIG. 4 shows a further illustrative embodiment of an RFID transponder 400. The RFID transponder 400 comprises the components described with reference to FIG. 3. FIG. 4 shows how the control logic 312 controls the charge pump stages 302, 304, 306, 308 in such a way that all stages contribute to the output voltage. To this purpose, the control logic 312 controls the controllable switches in such a way that all the switches between the charge pump stages 302, 304, 306, 308 are closed and all the switches between the charge pump stages 302, 304, 306, 308 and ground are open.

Figure 5:
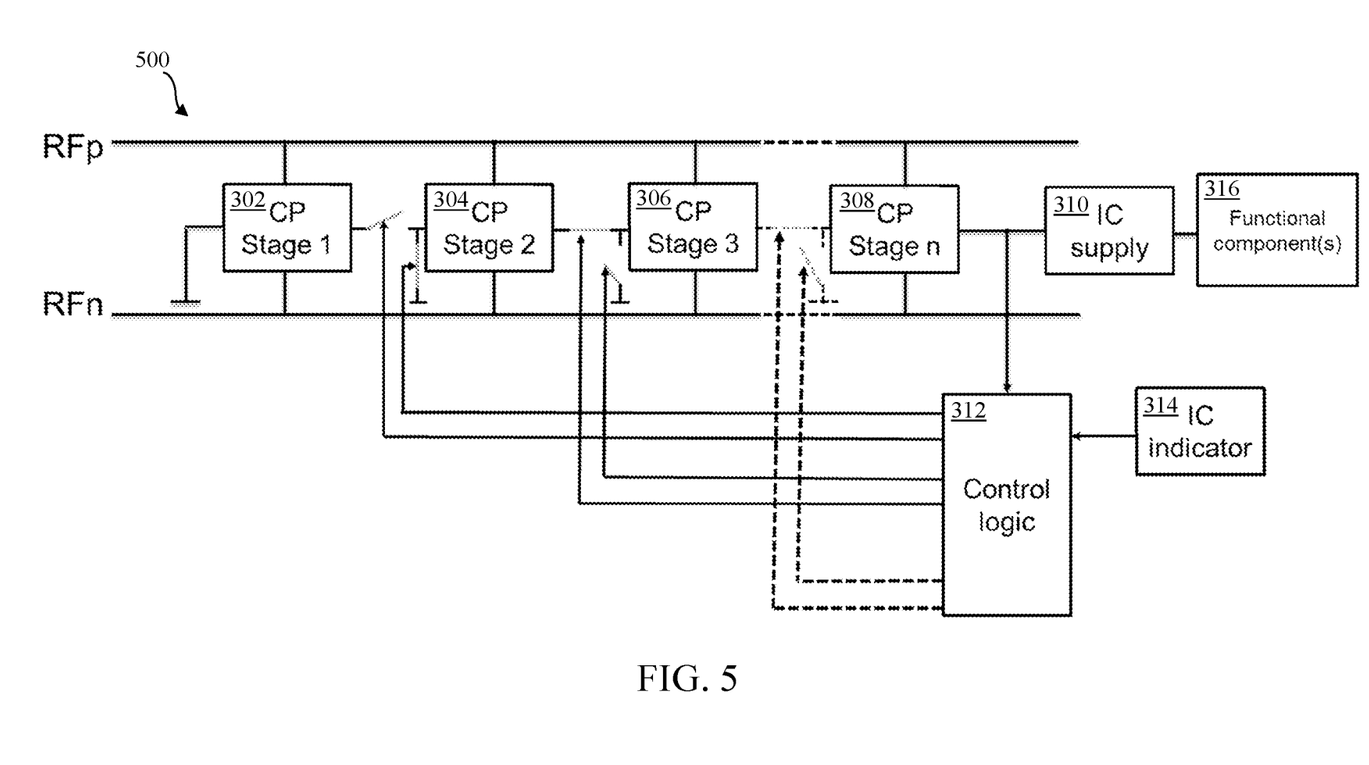
FIG. 5 shows a further illustrative embodiment of an RFID transponder.

FIG. 5 shows a further illustrative embodiment of an RFID transponder 500. The RFID transponder 500 comprises the components described with reference to FIG. 3. FIG. 5 shows how the control logic 312 controls the charge pump stages 302, 304, 306, 308 in such a way that the switch between the first charge pump stage 302 and the second charge pump stage 304 is open, and that all the switches between the second charge pump stage 304 to the $n^{th}$ charge pump stage 308 are closed. Furthermore, the control logic 312 controls the charge pump stages 302, 304, 306, 308 in such a way that the switch between the second charge pump stage 304 and ground is closed, and that all the switches between the third charge pump stage 306 to the $n^{th}$ charge pump stage 308 and ground are open. As a result, the first charge pump stage 302 is disabled, and only the second charge pump stage 304 to the $n^{th}$ charge pump stage 308 contribute to the output voltage. Thus, in this case, i=1, and the charge pump controller (i.e., the control logic 312) is configured to disable charge pump stage 1 by opening the controllable switch between charge pump stage 1 and the next charge pump stage i+1=2, and by closing the controllable switch between the next charge pump stage i+1=2 and ground. Note that it is assumed that, in a default state, all the controllable switches between the charge pump stages are closed, and that all the controllable switches between the charge pump stages and ground are open. As a result, the charge pump controller only needs to perform the above-described operations to disable charge pump stage 1.

Figure 6:
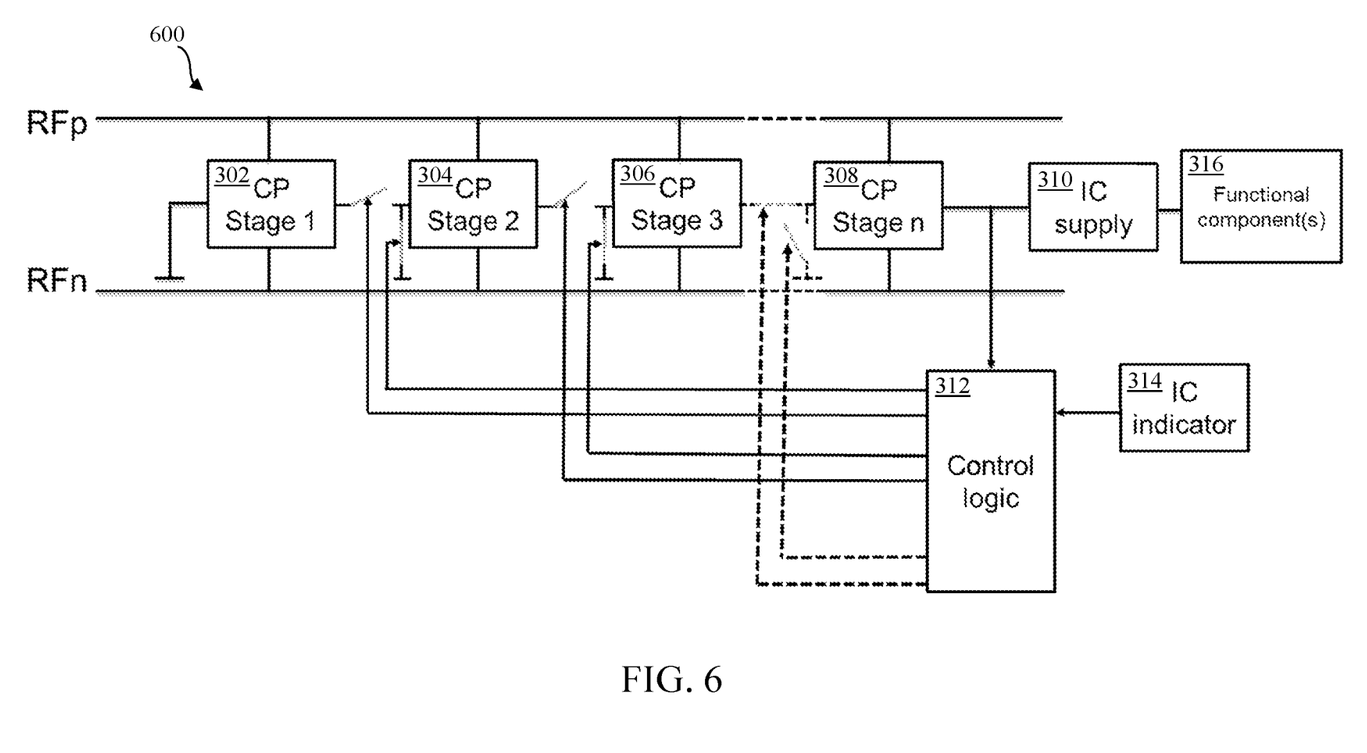
FIG. 6 shows a further illustrative embodiment of an RFID transponder.

FIG. 6 shows a further illustrative embodiment of an RFID transponder 600. The RFID transponder 600 comprises the components described with reference to FIG. 3. FIG. 6 shows how the control logic 312 controls the charge pump stages 302, 304, 306, 308 in such a way that the switches between the first charge pump stage 302 to the third charge pump stage 306 are open, and that all the switches between the third charge pump stage 306 to the $n^{th}$ charge pump stage 308 are closed. Furthermore, the control logic 312 controls the charge pump stages 302, 304, 306, 308 in such a way that the switches between the second charge pump stage 304 and ground, respectively between the third charge pump stage 306 and ground, are closed, and that all the remaining switches between the $n^{th}$ charge pump stage 308 and ground are open. As a result, the first charge pump stage 302 and the second charge pump stage 304 are disabled, and only the third charge pump stage 306 to the $n^{th}$ charge pump stage 308 contribute to the output voltage. Thus, in this case, i=1 in a first operation of the charge pump controller, and the charge pump controller (i.e., the control logic 312) is configured to disable charge pump stage 1 by opening the controllable switch between charge pump stage 1 and the next charge pump stage i+1=2, and by closing the controllable switch between the next charge pump stage i+1=2 and ground. Furthermore, i=2 in a second operation of the charge pump controller, and the charge pump controller is configured to disable charge pump stage 2 by opening the controllable switch between charge pump stage 2 and the next charge pump stage i+1=3, and by closing the controllable switch between the next charge pump stage i+1=3 and ground. Note that it is assumed that, in a default state, all the controllable switches between the charge pump stages are closed, and that all the controllable switches between the charge pump stages and ground are open. As a result, the charge pump controller only needs to perform the above-described operations to disable charge pump stage 1 and charge pump stage 2. Furthermore, it is noted that the charge pump controller does not need to perform two separate operations as described above. Alternatively, the charge pump controller may for example disable two stages simultaneously, i.e. in one control cycle.

It is noted that the above-described implementation has been presented only for illustrative purposes. In particular, the skilled person will appreciate that other implementations are possible as well. For example, in the embodiment shown in FIG. 6, once the second operation has been performed, the state of the switch between charge pump stage 1 and charge pump stage 2 and the switch between charge pump stage 2 and ground are no longer relevant, in the sense that a change of state of those switches has no impact on the functioning of the sequence of charge pump stage 3 to the $n^{th}$ charge pump stage. Thus, the switch between charge pump stage 1 and charge pump stage 2 may be closed again, while the switch between charge pump stage 2 and ground may be opened. This may be beneficial for certain applications of the RFID transponder.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 RFID transponder
102 functional component
104 charge pump
106 charge pump controller
200 method of operating an RFID transponder
202 controlling, by a charge pump controller of an RFID transponder, a number of charge pump stages which contribute to an output voltage of a charge pump
204 supplying, by the charge pump, the output voltage to at least one functional component of the RFID transponder
206 performing, by the functional component, a function of the RFID transponder
300 RFID transponder
302 charge pump stage
304 charge pump stage
306 charge pump stage
308 charge pump stage
310 IC supply
312 control logic
314 IC indicator
316 functional component(s)
400 RFID transponder
500 RFID transponder
600 RFID transponder

The invention claimed is:

1. A radio frequency identification, RFID, transponder, comprising:
at least one functional component configured to perform a function of the RFID transponder;
a charge pump configured to supply an output voltage to said functional component, wherein said charge pump comprises a sequence of n charge pump stages and a plurality of first controllable switches and a plurality of second controllable switches, wherein each charge pump stage of the n charge pump stages is coupled to ground through a first controllable switch of the plurality of first controllable switches, and wherein each charge pump stage of the n charge pump stages are coupled to each other through a second controllable switch of the plurality of second controllable switches;
a charge pump controller configured to control a number of charge pump stages which contribute to the output voltage, wherein the charge pump controller is configured to disable one or more specific charge pump stages i, where i=1, 2, 3, . . . n, by opening the second controllable switch between a charge pump stage i and a next charge pump stage i+1, and by closing the first controllable switch between the next charge pump stage i+1 and ground.

2. The RFID transponder of claim 1, wherein the charge pump controller is configured to control said n charge pump stages in dependence on the output voltage.

3. The RFID transponder of claim 1, wherein the charge pump controller is configured to disable one or more of said charge pump stages.

4. The RFID transponder of claim 3, wherein the charge pump controller is configured to disable more charge pump stages as the output voltage increases.

5. The RFID transponder of claim 3, wherein the charge pump controller is configured to disable fewer charge pump stages as the output voltage decreases.

6. The RFID transponder of claim 1, wherein the charge pump controller is configured to control said n charge pump stages in dependence on a status indicator.

7. The RFID transponder of claim 1, wherein the RFID transponder is implemented in a communication system having an RFID reader.

8. A method of operating a radio frequency identification, RFID, transponder, comprising:
controlling, by a charge pump controller of the RFID transponder, a sequence n of charge pump stages which contribute to an output voltage of a charge pump, wherein the n charge pump stages are each coupled to ground through a corresponding first controllable switch of a plurality of first controllable switches, wherein the n charge pump stages are coupled to each other through a corresponding second controllable switch of a plurality of second controllable switches, and wherein the charge pump controller disables one or more specific charge pump stages i=1, 2, 3, . . . n by opening the second controllable switch between a charge pump stage i and a next charge pump stage i+1, and by closing the first controllable switch between the next charge pump stage i+1 and ground;

supplying, by the charge pump, the output voltage to at least one functional component of the RFID transponder; and performing, by the functional component, a function of the RFID transponder.

9. The method of claim 8, wherein the charge pump controller controls said n charge pump stages in dependence on the output voltage.

10. The method of claim 8, wherein the charge pump controller disables one or more of said charge pump stages.

11. The method of claim 10, wherein the charge pump controller disables more charge pump stages as the output voltage increases.

12. The method of claim 10, wherein the charge pump controller disables fewer charge pump stages as the output voltage decreases.

13. The method of claim 8, wherein the charge pump controller controls said n charge pump stages in dependence on a status indicator.

14. The method of claim 8, wherein the method is implemented in a plurality of computer instructions stored on a non-transitory machine-readable medium.

* * * * *